(12) United States Patent
Komori et al.

(10) Patent No.: US 11,865,999 B2
(45) Date of Patent: Jan. 9, 2024

(54) VEHICLE SEATBELT DEVICE, TENSION CONTROL METHOD, AND STORAGE MEDIUM

(71) Applicant: HONDA MOTOR CO., LTD., Tokyo (JP)

(72) Inventors: Kenji Komori, Wako (JP); Shinsuke Odai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/690,023

(22) Filed: Mar. 9, 2022

(65) Prior Publication Data

US 2022/0306040 A1 Sep. 29, 2022

(30) Foreign Application Priority Data

Mar. 24, 2021 (JP) .................................. 2021-049683

(51) Int. Cl.
*B60R 22/195* (2006.01)
*G01S 13/72* (2006.01)

(52) U.S. Cl.
CPC ........ *B60R 22/1951* (2013.01); *G01S 13/723* (2013.01)

(58) Field of Classification Search
CPC .......... B60R 22/195; B60R 2022/4685; B60R 2021/0009; B60R 2021/0023
See application file for complete search history.

(56) References Cited

U.S. PATENT DOCUMENTS

| 7,481,460 B2* | 1/2009 | Odate .................... B60R 22/46 280/806 |
| 7,686,118 B2* | 3/2010 | Akaba .................. B60R 21/013 280/806 |
| 8,890,712 B2* | 11/2014 | Mochizuki ............. G08G 1/163 340/439 |
| 10,065,589 B2* | 9/2018 | Sun ....................... B60R 21/013 |
| 11,173,860 B2* | 11/2021 | Akaba ................. B60R 21/0132 |
| 2006/0047388 A1* | 3/2006 | Oka ...................... B60R 21/013 701/41 |

(Continued)

FOREIGN PATENT DOCUMENTS

| CN | 108290540 A | * | 7/2018 | ............. B60L 3/0007 |
| CN | 108292356 A | * | 7/2018 | ............. B60L 3/0007 |

(Continued)

*Primary Examiner* — Barry Gooden, Jr.
(74) *Attorney, Agent, or Firm* — Amin, Turocy & Watson, LLP

(57) ABSTRACT

A vehicle seatbelt device according to an embodiment includes a seatbelt that restrains a part of the body of an occupant in a host vehicle, a tension adjustment mechanism that is able to adjust a tension of the seatbelt, a recognizer that recognizes situation in the vicinity of the host vehicle, an index value deriver that derives an index value indicating an overlapping degree between a predicted traveling trajectory of another vehicle which is recognized by the recognizer and approaches the host vehicle and a predicted traveling trajectory of the host vehicle, and a tension controller that controls an operation timing of the tension adjustment mechanism on the basis of the index value derived by the index value deriver and a degree of approach of the another vehicle with respect to the host vehicle.

8 Claims, 8 Drawing Sheets

(56) References Cited

U.S. PATENT DOCUMENTS

| | | | | |
|---|---|---|---|---|
| 2008/0201042 A1* | 8/2008 | Cuddihy | ............ | B60R 21/0134 |
| | | | | 701/45 |
| 2017/0129434 A1* | 5/2017 | Sun | ...................... | B60W 30/08 |
| 2022/0242350 A1* | 8/2022 | Odai | ...................... | B60K 35/00 |
| 2022/0242363 A1* | 8/2022 | Odai | ...................... | B60R 22/48 |
| 2022/0242364 A1* | 8/2022 | Odai | ...................... | G06V 20/56 |

FOREIGN PATENT DOCUMENTS

| | | | | |
|---|---|---|---|---|
| CN | 109733314 A | * | 5/2019 | |
| DE | 10345726 B4 | * | 11/2013 | ........... B60R 21/013 |
| DE | 102017128671 A1 | * | 9/2018 | ........... B60W 10/18 |
| DE | 102017003440 A1 | * | 10/2018 | ............ B60Q 1/525 |
| DE | 102017003440 B4 | * | 4/2021 | ............ B60Q 1/525 |
| JP | 60-015240 | | 1/1985 | |
| JP | 11-348730 | | 12/1999 | |
| JP | 2006264672 A | * | 10/2006 | ......... B60R 21/0132 |
| JP | 2006281978 A | * | 10/2006 | |
| KR | 20170131968 A | * | 12/2017 | ........ B60R 21/0134 |
| WO | WO-2017079349 A1 | * | 5/2017 | ............ B60L 3/0007 |

\* cited by examiner

VEHICLE SEATBELT DEVICE, TENSION CONTROL METHOD, AND STORAGE MEDIUM

CROSS-REFERENCE TO RELATED APPLICATION

This application is based upon and claims the benefit of priority from Japanese Patent Application No. 2021-049683, filed Mar. 24, 2021, the entire content of which is incorporated herein by reference.

BACKGROUND

Field of the Invention

The present invention relates to a vehicle seatbelt device, a tension control method, and a storage medium.

Description of Related Art

In the related art, a technology of adjusting a tension of a seatbelt when a vehicle is in danger or at the time of controlling an automatic brake is known (for example, Japanese Unexamined Patent Application, First Publication No. S60-15240 and Japanese Unexamined Patent Application, First Publication No. H11-348730).

SUMMARY

However, in the technology in the related art, a seatbelt may not be appropriately controlled on the basis of a relationship between another vehicle present in the vicinity and a host vehicle.

Aspects of the present invention have been made in consideration of such situation, and an object thereof is to provide a vehicle seatbelt device, a tension control method, and a storage medium, in which operation of a seatbelt can be more appropriately controlled in accordance with situation in the vicinity.

The vehicle seatbelt device, the tension control method, and the storage medium according to this invention employ the following constitutions.

(1): A vehicle seatbelt device according to an aspect of this invention is a vehicle seatbelt device including a seatbelt that restrains a part of the body of an occupant in a host vehicle, a tension adjustment mechanism that is able to adjust a tension of the seatbelt, a recognizer that recognizes situation in the vicinity of the host vehicle, an index value deriver that derives an index value indicating an overlapping degree between a predicted traveling trajectory of another vehicle which is recognized by the recognizer and approaches the host vehicle and a predicted traveling trajectory of the host vehicle, and a tension controller that controls an operation timing of the tension adjustment mechanism on the basis of the index value derived by the index value deriver and a degree of approach of the another vehicle with respect to the host vehicle.

(2): According to the aspect of the foregoing (1), when the index value is equal to or larger than a threshold, the tension controller brings the operation timing of the tension adjustment mechanism earlier compared to when the index value is smaller than the threshold.

(3): According to the aspect of the foregoing (1), the recognizer recognizes a road demarcation line demarcating a road on which the host vehicle is traveling, and when the another vehicle is approaching the host vehicle while straddling the road demarcation line, the tension controller brings the operation timing of the tension adjustment mechanism earlier compared to when the another vehicle is not straddling the road demarcation line.

(4): According to the aspect of the foregoing (1), when the recognizer recognizes that a direction indicator of the another vehicle approaching the host vehicle is operating, the tension controller brings the operation timing of the tension adjustment mechanism earlier compared to when the direction indicator is not operating.

(5): According to the aspect of the foregoing (1), the tension controller intensifies the tension of the seatbelt on the basis of the operation timing.

(6): According to the aspect of the foregoing (1), the degree of approach includes information related to a time when the host vehicle and the another vehicle are predicted to come into contact with each other.

(7): According to the aspect of the foregoing (1), when a radius of curvature of a traveling lane of the host vehicle is smaller than a first predetermined value or when curvature of the traveling lane is equal to or larger than a second predetermined value, the tension controller brings the operation timing of the tension adjustment mechanism earlier compared to when the radius of curvature of the traveling lane of the host vehicle is equal to or larger than the first predetermined value or when the curvature of the traveling lane is smaller than the second predetermined value.

(8): A tension control method according to another aspect of this invention is a tension control method in which a computer of a vehicle seatbelt device recognizes situation in the vicinity of a host vehicle, derives an index value indicating an overlapping degree between a predicted traveling trajectory of recognized another vehicle approaching the host vehicle and a predicted traveling trajectory of the host vehicle, and controls an operation timing of a tension adjustment mechanism which is able to adjust a tension of a seatbelt restraining a part of the body of an occupant in the host vehicle on the basis of the derived index value and a degree of approach of the another vehicle with respect to the host vehicle.

(9): A storage medium according to further another aspect of this invention is a computer readable non-temporary storage medium storing a program for causing a computer of a vehicle seatbelt device to recognize situation in the vicinity of a host vehicle, to derive an index value indicating an overlapping degree between a predicted traveling trajectory of recognized another vehicle approaching the host vehicle and a predicted traveling trajectory of the host vehicle, and to control an operation timing of a tension adjustment mechanism which is able to adjust a tension of a seatbelt restraining a part of the body of an occupant in the host vehicle on the basis of the derived index value and a degree of approach of the another vehicle with respect to the host vehicle.

According to the aspects of the foregoing (1) to (9), operation of a seatbelt can be more appropriately controlled in accordance with situation in the vicinity.

DESCRIPTION OF EMBODIMENTS

Hereinafter, an embodiment of a vehicle seatbelt device, a tension control method, and a storage medium according to the present invention will be described with reference to the drawings. In the present embodiment, a case in which regulations for left-hand traffic are applied will be described as an example. However, when regulations for right-hand traffic are applied, the left and right sides may be read in reverse.

Figure 1:
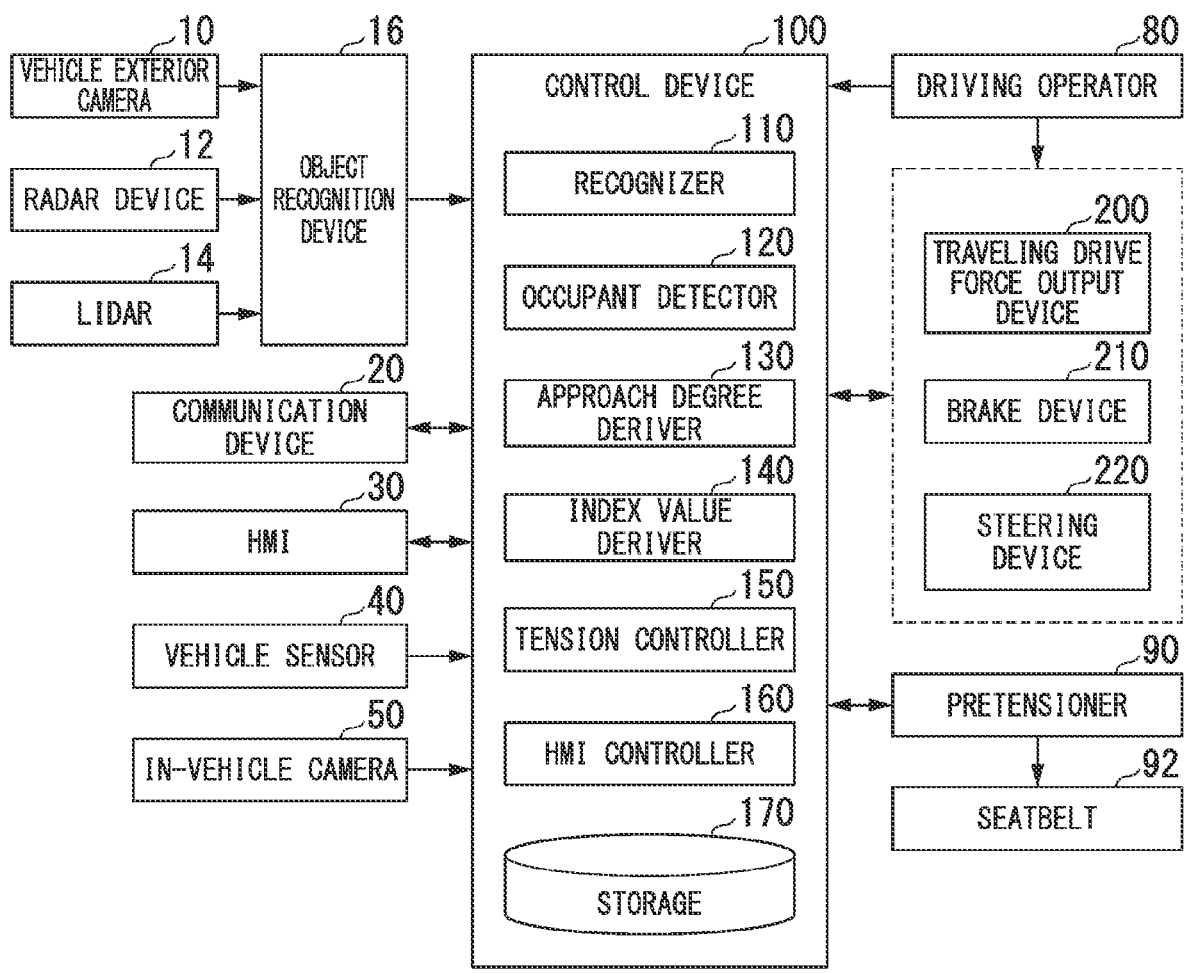
FIG. 1 is a view showing an example of a constitution of a vehicle seatbelt device.

FIG. 1 is a view showing an example of a constitution of a vehicle seatbelt device 1. For example, the vehicle seatbelt device 1 includes a vehicle exterior camera 10, a radar device 12, a light detection and ranging (LIDAR) 14, an object recognition device 16, a communication device 20, a human-machine interface (HMI) 30, a vehicle sensor 40, an in-vehicle camera 50, a driving operator 80, a pretensioner 90, a seatbelt 92, a control device 100, a traveling drive force output device 200, a brake device 210, and a steering device 220. The pretensioner 90 is an example of "a tension adjustment mechanism".

For example, the vehicle exterior camera 10 is a digital camera utilizing a solid-state image capturing element such as a charge coupled device (CCD) or a complementary metal oxide semiconductor (CMOS).

The vehicle exterior camera 10 is attached to an arbitrary place in a vehicle in which the vehicle seatbelt device 1 is mounted (hereinafter, a host vehicle M). The vehicle exterior camera 10 is attached to an upper part of a front windshield, a rear surface of a rear-view mirror, a front head of a vehicle body, or the like. When an image of a side behind the vehicle is captured, the vehicle exterior camera 10 may be attached to an upper part of a rear windshield, a back door, or the like or may be attached to a side mirror or the like. For example, the vehicle exterior camera 10 periodically and repeatedly captures an image of the vicinity of the host vehicle M. The vehicle exterior camera 10 may be a stereo camera.

The radar device 12 radiates radio waves such as millimeter waves to the vicinity of the host vehicle M and detects at least a position (a distance and an azimuth) of an object in the vicinity by detecting radio waves (reflected waves) reflected by the object. The radar device 12 is attached to an arbitrary place in the host vehicle M. The radar device 12 may detect a position and a speed of an object by a frequency modulated continuous wave (FM-CW) method.

The LIDAR 14 emits light to the vicinity of the host vehicle M and measures scattered light. The LIDAR 14 detects a distance to a target on the basis of a time from light emission to light reception. For example, emitted light is pulsed laser light. The LIDAR 14 is attached to an arbitrary place in the host vehicle M.

The object recognition device 16 recognizes a position, a kind, a speed, and the like of an object in the vicinity of the host vehicle M by performing sensor fusion processing with respect to detection results by some or all of the vehicle exterior camera 10, the radar device 12, and the LIDAR 14. Examples of an object include another vehicle (for example, a peripheral vehicle present within a predetermined distance), a pedestrian, a bicycle, and a road structure. Examples of a road structure include a road sign, a traffic signal, a railroad crossing, a curbstone, a medial divider, a guardrail, and a fence. Examples of a road structure may include a road demarcation line and a crosswalk which are painted or adhered on a road surface, and a road surface sign such as a bicycle crossing lane or a stop sign line. An object may include an obstacle such as a fallen object on a road (for example, a load of another vehicle or a signboard installed in the vicinity of a road). The object recognition device 16 outputs recognition results to the control device 100. The object recognition device 16 may output detection results of the vehicle exterior camera 10, the radar device 12, and the LIDAR 14 to the control device 100 without any change. In this case, the control device 100 may have functions of the object recognition device 16.

The communication device 20 communicates with a another vehicle present in the vicinity of the host vehicle M, a terminal device of a user using the host vehicle M, or various server devices, for example, by utilizing a network such as a cellular network, a Wi-Fi network, Bluetooth (registered trademark), dedicated short range communication (DSRC), a local area network (LAN), a wide area network (WAN), and Internet, for example.

The HMI 30 presents various kinds of information to an occupant in the host vehicle M and receives an input operation of the occupant. For example, the HMI 30 may include a display device, a speaker, a buzzer, a touch panel, a switch, a key, a microphone, and the like.

The vehicle sensor 40 includes a vehicle speed sensor for detecting a speed of the host vehicle M, an acceleration sensor for detecting an acceleration, a yaw rate sensor for detecting a yaw rate (for example, a rotation angular speed about a vertical axis passing through a centroidal point of the host vehicle M), an azimuth sensor for detecting a direction of the host vehicle M, and the like. The vehicle sensor 40 may include a position sensor for detecting a position of the host vehicle M. For example, the position sensor is a sensor for acquiring positional information (longitude/latitude information) from a global positioning system (GPS) device. For example, the position sensor may be a sensor for acquiring positional information using a global navigation satellite system (GNSS) receiver. For example, the vehicle sensor 40 may include a load sensor for detecting a load applied to a seat present inside a compartment of the host vehicle M, a tension sensor attached to the seatbelt, and the like. The vehicle sensor 40 outputs detection results of various sensors to the control device 100.

Similar to the vehicle exterior camera 10, for example, the in-vehicle camera 50 is a digital camera utilizing a solid-state image capturing element such as a CCD or a CMOS. The in-vehicle camera 50 is provided inside the compartment of the host vehicle M and captures images centering on the face of an occupant sitting on the seat. The in-vehicle camera 50 may be a camera capturing images of an occupant sitting on a particular seat or may be a camera capturing images of a plurality of occupants present inside the compartment. The in-vehicle camera 50 outputs images captured in a predetermined cycle to the control device 100.

For example, the driving operator 80 includes an accelerator pedal, a brake pedal, a shift lever, a steering wheel, a modified steering wheel, a joystick, and other operators. A sensor for detecting an operation amount or the presence or absence of an operation is attached to the driving operator 80, and detection results thereof are output to some or all of the traveling drive force output device 200, the brake device 210, and the steering device 220.

The pretensioner 90 has a mechanism for pulling the seatbelt 92 to the seat side (winding the seatbelt 92) in an electrically driven manner in order to eliminate looseness of the seatbelt 92. The seatbelt 92 is a belt-shaped safety device for restraining the body of an occupant in the seat. For example, the pretensioner 90 intensifies a tension of the seatbelt 92 in stages by means of driving of a motor and operates so as to intensify a restraining force of the seatbelt 92. For example, the pretensioner 90 and the seatbelt 92 are provided for each of the seats installed inside the compartment of the host vehicle M. For example, in the pretensioner 90, an operation timing, an amount of tension, and the like are controlled in response to control of a tension controller 150.

For example, the control device 100 includes a recognizer 110, an occupant detector 120, an approach degree deriver 130, an index value deriver 140, the tension controller 150, an HMI controller 160, and a storage 170. Each of the recognizer 110, the occupant detector 120, the approach degree deriver 130, the index value deriver 140, the tension controller 150, and the HMI controller 160 is realized by a hardware processor such as a central processing unit (CPU) executing a program (software), for example. Some or all of these constituent elements may be realized by hardware (a circuit; including circuitry) such as a large scale integration (LSI), an application specific integrated circuit (ASIC), a field-programmable gate array (FPGA), or a graphics processing unit (GPU), or may be realized by software and hardware in cooperation. A program may be stored in advance in a storage device (a storage device including a non-transitory storage medium) such as a hard disk drive (HDD) of the control device 100 or a flash memory, or may be stored in an attachable/detachable storage medium such as a DVD or a CD-ROM and may be installed in the HDD of the control device 100 or the flash memory when the storage medium (a non-transitory storage medium) is mounted in a drive device.

The storage 170 may be realized by the foregoing various storage devices, a solid state drive (SSD), an electrically erasable programmable read only memory (EEPROM), a read only memory (ROM), a random access memory (RAM), or the like. For example, the storage 170 stores information necessary to execute control of the tension of the seatbelt according to the present embodiment, a program, various other kinds of information, and the like. The storage 170 may store map information. For example, the map information is information in which road shapes are expressed by links indicating roads and nodes connected by the links. The map information may include curvature of roads, point-of-interest (POI) information, and the like. The map information may include information of the centers of lanes, information of boundaries of lanes, and the like or may include road information (classification of roads), legal speeds (speed limits, maximum speeds, and minimum speeds), traffic regulation information, address information (address/zip code), facility information, telephone number information, and the like. Each piece of the information included in the map information is associated with the positional information. The map information may be updated at all times through communication between the communication device 20 and other devices.

The recognizer 110 recognizes a state of an object, such as a position, a speed, and an acceleration, in the vicinity of the host vehicle M on the basis of information input from the vehicle exterior camera 10, the radar device 12, and the LIDAR 14 via the object recognition device 16. The vicinity of the host vehicle M denotes a range within a predetermined distance centering on the host vehicle M. For example, a position of an object is recognized as a position on absolute coordinates having a representative point of the host vehicle M (the center of gravity, the center of a drive shaft, or the like) as the origin and is used for control. A position of an object may be expressed by the representative point of the center of gravity of the object, a corner, or the like or may be expressed by an expressed region. For example, "a state" of an object may include, when the object is a moving body such as another vehicle, an acceleration and a jerk of the object or "a behavior state" (for example, attempting or whether or not attempting a lane change).

For example, the recognizer 110 recognizes a lane (a traveling lane) in which the host vehicle M is traveling. For example, the recognizer 110 recognizes a traveling lane by comparing a pattern of a road demarcation line (for example, arrangement of solid lines and dotted lines) obtained from the map information stored in the storage 170 and a pattern of a road demarcation line in the vicinity of the host vehicle M recognized from an image captured by the vehicle exterior camera 10. Without being limited to a road demarcation line, the recognizer 110 may recognize a traveling lane by recognizing a traveling course boundary (a road boundary) including a road demarcation line, a road shoulder, a curbstone, a medial divider, a guardrail, or the like. The recognizer 110 may recognize a stop sign line, an obstacle, a red signal, a tollgate, other road events.

The recognizer 110 recognizes a position or a posture of the host vehicle M with respect to a traveling lane when recognizing a traveling lane. For example, the recognizer 110 may recognize a deviation of a reference point in the host vehicle M from the center of a lane and an angle of the host vehicle M with respect to a line in which the centers of lane in a forward movement direction are connected as the relative position and posture of the host vehicle M with respect to a traveling lane. In place thereof, the recognizer 110 may recognize a position of a reference point in the host vehicle M with respect to any side end (a road demarcation line or a road boundary) of a traveling lane, or the like as the relative position of the host vehicle M with respect to a traveling lane. In addition to the host vehicle M, the recognizer 110 may recognize a position or a posture of another vehicle present in the vicinity of the host vehicle M (particularly, another vehicle approaching the host vehicle M) with respect to a traveling lane, a relative position thereof with respect to a traveling lane, or the like.

The occupant detector 120 detects which seat an occupant is sitting on in the seats present inside the compartment of the host vehicle M on the basis of an image captured by the in-vehicle camera 50, or the load sensor or the tension sensor included in the vehicle sensor 40. For example, the occupant detector 120 performs facial recognition analyzing the image captured by the in-vehicle camera 50 and detects that an occupant is sitting at the position of the seat where the face is recognized. In place of (or in addition to) the facial recognition described above, the occupant detector 120 may detect that an occupant is present in the corresponding seat when a load on a seat detected by the load sensor is equal to or larger than a predetermined value or when a tension of a seatbelt detected by the tension sensor is equal to or larger than a predetermined value.

The approach degree deriver 130 derives a degree of approach of another vehicle recognized by the recognizer 110 with respect to the host vehicle M. For example, the degree of approach denotes an index value based on relative positions or relative speeds between the host vehicle M and another vehicle.

The index value deriver 140 acquires an index value indicating an overlapping degree between the host vehicle M and another vehicle approaching the host vehicle M. Details of the functions of the approach degree deriver 130 and the index value deriver 140 will be described below.

The tension controller 150 adjusts the tension of the seatbelt 92 by controlling the operation timing of the pretensioner 90 or controlling the amount of tension of the seatbelt 92. For example, the tension controller 150 may perform control with respect to the pretensioner 90 which is associated with a seat where the occupant detected by the occupant detector 120 is sitting on and may not perform control with respect to the pretensioner 90 which is associated with a seat where no occupant is sitting on. Details of the function of the tension controller 150 will be described below.

The HMI controller 160 notifies a driver of the host vehicle M of predetermined information by means of the HMI 30 or acquires details of the operation of an occupant received by the HMI 30. For example, the predetermined information includes driving assist information. For example, the driving assist information includes a speed, an engine rpm, a remaining fuel amount, a radiator coolant temperature, a traveled distance, a shift lever state, and other information of the host vehicle M. The driving assist information may include information indicating the host vehicle M, a traveling lane, and a position (a relative position) of another vehicle present in the vicinity, information indicating that another vehicle is approaching the host vehicle M (a warning), information indicating that the pretensioner 90 is operating or has operated, and the like.

For example, the HMI controller 160 may generate an image including the predetermined information described above and cause the display device of the HMI 30 to display the generated image, or may generate an audio indicating the predetermined information and output the generated audio from the speaker of the HMI 30.

The traveling drive force output device 200 outputs a traveling drive force (a torque) for causing the host vehicle M to travel to driving wheels. For example, the traveling drive force output device 200 includes a combination of an internal-combustion engine, an electric motor, a transmission, and the like, and an electronic control unit (an ECU) for controlling these.

The ECU controls the foregoing constituents in accordance with information input from the driving operator 80.

For example, the brake device 210 includes a brake caliper, a cylinder for transmitting a hydraulic pressure to the brake caliper, an electric motor for generating a hydraulic pressure in the cylinder, and a brake ECU. The brake ECU controls the electric motor in accordance with information input from the driving operator 80 such that a brake torque corresponding to a braking operation is output to each wheel. The brake device 210 may include a mechanism for transmitting a hydraulic pressure generated by an operation of the brake pedal included in the driving operator 80 to the cylinder via a master cylinder as a backup.

For example, the steering device 220 includes a steering ECU and an electric motor.

For example, the electric motor changes a direction of a steered wheel by causing a force to act on a rack-and-pinion mechanism. The steering ECU changes the direction of the steered wheel by driving the electric motor in accordance with information input from a steering wheel 82 of the driving operator 80.

[Approach Degree Deriver]

Figure 2:
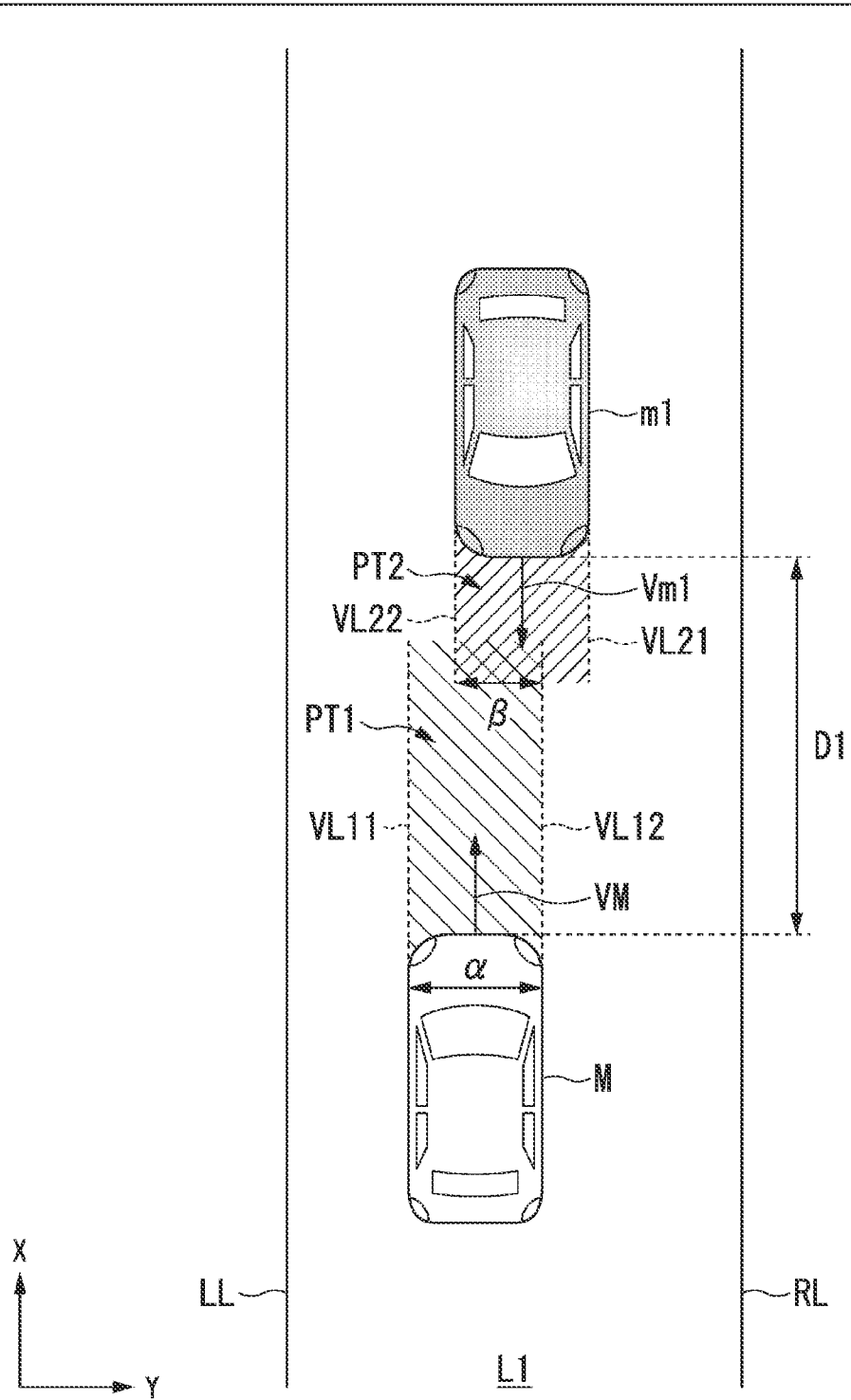
FIG. 2 is an explanatory view of a function of an approach degree deriver.

Next, details of the function of the approach degree deriver 130 will be described. FIG. 2 is an explanatory view of a function of an approach degree deriver. In the example of FIG. 2, the host vehicle M traveling at a speed VM in a lane L1 extending along the axis X in the diagram and an oncoming another vehicle m1 traveling at a speed vm1 toward the host vehicle M in the forward movement direction are illustrated. The lane L1 is demarcated by road demarcation lines LL and RL. Hereinafter, description will be given using only one another vehicle m1. However, when a plurality of another vehicles are present in the vicinity of the host vehicle M, the processing described below may be performed for each another vehicle, or the processing described below may be performed preferentially for the another vehicle closest to the host vehicle M.

The approach degree deriver 130 derives a degree of approach of another vehicle with respect to the host vehicle M. Specifically, for example, the degree of approach is a time when the host vehicle M and the another vehicle m1 are predicted to come into contact with each other (TTC; time-to-collision). The TTC denotes a value obtained by dividing the distance between the host vehicle M and the another vehicle m1 by the relative speed (limited to the approaching side). In place of the TTC, the approach degree deriver 130 may derive a degree of approach on the basis of only a relative distance. The approach degree deriver 130 may acquire a degree of approach on the basis of an amount of change in positions of the host vehicle M and the another vehicle m1 in time series. Hereinafter, an example of a degree of approach will be described using a TTC. In the example of FIG. 2, the approach degree deriver 130 derives a TTC by dividing a distance D1 between the host vehicle M and the another vehicle m1 by a relative speed (VM−(−Vm1)).

[Index Value Deriver]

Next, details of the function of the index value deriver 140 will be described. The index value deriver 140 derives an index value indicating an overlapping degree between the host vehicle M and the another vehicle m1. For example, the index value denotes an overlapping ratio. For example, the index value deriver 140 derives an overlapping amount between a predicted traveling trajectory in the future based on a traveling trail of the host vehicle M immediately before and a predicted traveling trajectory in the future based on a traveling trail of the another vehicle m1 immediately before as an overlapping ratio. For example, the expression "immediately before" denotes a time of approximately several seconds. For example, a predicted traveling trajectory of the host vehicle M is a region sandwiched between two virtual lines extending from left and right ends of the host vehicle M in a forward direction of the vehicle body of the host vehicle M on the assumption that the speed VM and a steering angle of the host vehicle M are constant. For example, a predicted traveling trajectory of the host vehicle M may be a region set on the basis of a speed vector of the host vehicle M. Similar to that of the host vehicle M, the index value deriver 140 sets a predicted traveling trajectory of the another vehicle m1. In the example of FIG. 2, a predicted traveling trajectory PT1 sandwiched between virtual line VL11 and VL12 extending from the left end and the right end of the host vehicle M in the forward movement direction of the host vehicle M and a predicted traveling trajectory PT2 sandwiched between virtual lines VL21 and VL22 extending from the left end and the right end of the another vehicle m1 in the forward movement direction of the another vehicle m1 are illustrated.

For example, the index value deriver 140 derives a vehicle width α of the host vehicle M and an overlapping amount (in the example of FIG. 2, the distance between the virtual lines VL12 and VL22 in a lateral direction (a road width direction)) β between the predicted traveling trajectories PT1 and PT2. The vehicle width α may be rephrased as a distance between the virtual lines VL11 and VL12 in the lateral direction. The overlapping amount β may be rephrased as an overlap amount. Further, the index value deriver 140 acquires a value obtained by multiplying a value, which is obtained by dividing the overlapping amount β by the vehicle width α, by 100 ((β/α)×100) as an overlapping ratio [%]. The index value deriver 140 may derive an overlap amount as an index value in place of an overlapping ratio.

Figure 3:
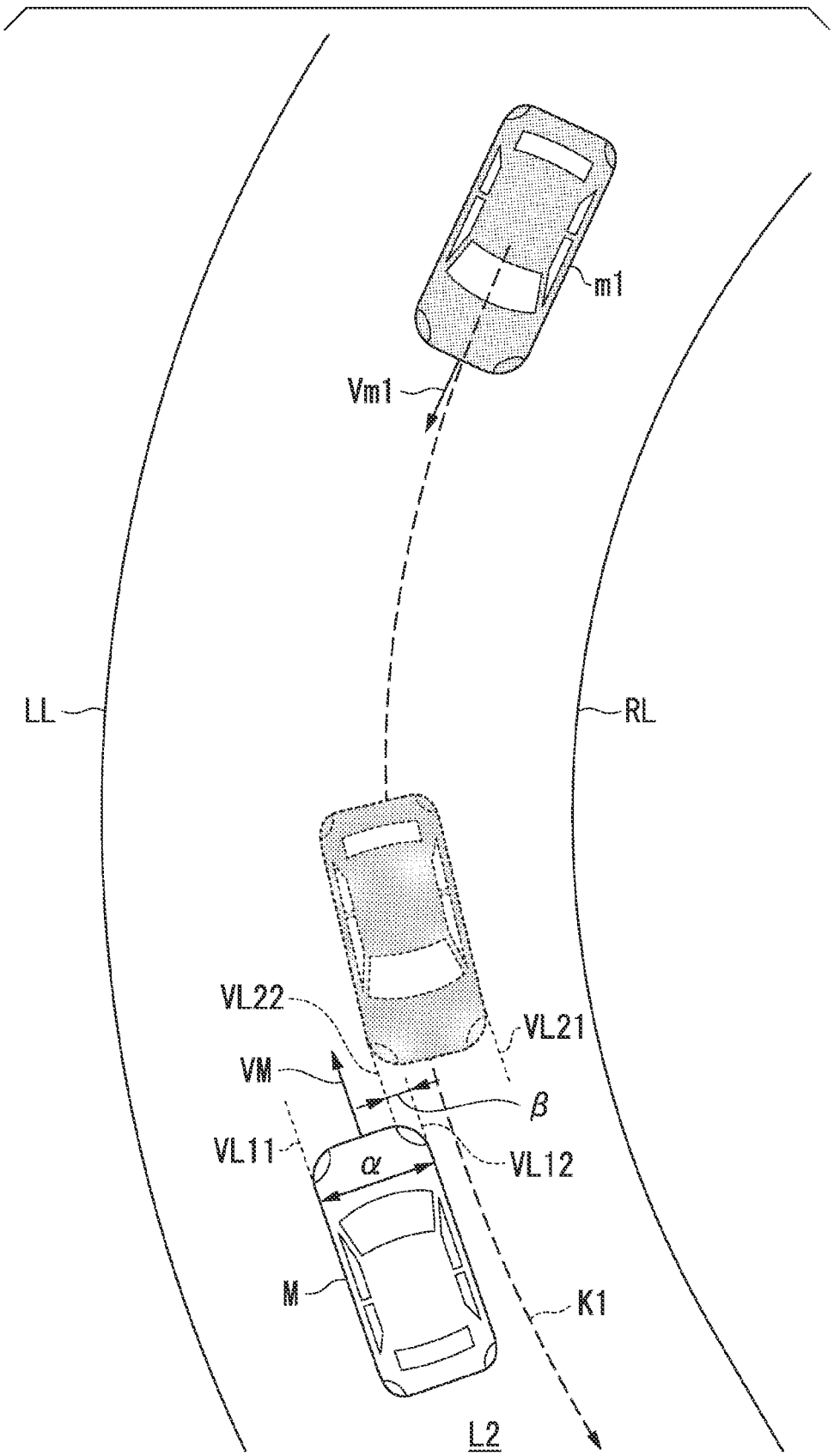
FIG. 3 is an explanatory view of a method of deriving an overlapping ratio in a case of traveling on a curved road.

For example, the index value deriver 140 may change a method of deriving an overlapping ratio in accordance with a road shape. FIG. 3 is an explanatory view of a method of deriving an overlapping ratio in a case of traveling on a curved road. In the example of FIG. 3, an example in which the host vehicle M is traveling at the speed VM in a lane L2 that is a curved road demarcated by the road demarcation lines LL and RL and the another vehicle m1 that is an oncoming vehicle is approaching the host vehicle M at a speed Vm1 is illustrated. In this case, the index value deriver 140 derives a predicted traveling trail of the host vehicle M in the future in consideration of a road shape (curvature), the steering angle of the host vehicle M, and the like on the assumption that the speed VM of the host vehicle M is constant. A road shape may be acquired by analyzing an image captured by the vehicle exterior camera 10 or may acquire a road shape of the traveling lane L2 of the host vehicle M with reference to map information stored in the storage 170 on the basis of positional information of the host vehicle M detected by the vehicle sensor 40.

The index value deriver 140 derives a predicted traveling trail of the another vehicle m1 in the future by performing fitting with respect to a trajectory model of a traveling route K1 with respect to a road shape on the assumption that the speed Vm1 of the another vehicle m1 is constant. Further, the index value deriver 140 derives an overlapping ratio ((β/α)×100) [%] at the time when the another vehicle m1 has approached the host vehicle M on the basis of each of the derived predicted traveling trails in the future. Accordingly, at the present time, even in situation in which the overlapping ratio is small, an appropriate index value can be derived more quickly by predicting a degree of approach in accordance with situation in the vicinity including road situation.

[Tension Controller]

The tension controller 150 causes the pretensioner 90 to operate, pulls the seatbelt 92, and more intensively restrains an occupant sitting on a seat on the basis of the degree of approach between the host vehicle M and the another vehicle m1 derived by the approach degree deriver 130. In this case, the tension controller 150 switches the operation timing of the pretensioner 90 depending on whether or not the index value derived by the index value deriver 140 is equal to or larger than a threshold.

For example, when the overlapping ratio (an example of the index value) is equal to or larger than the threshold, the tension controller 150 brings the operation timing of the pretensioner 90 earlier compared to when the overlapping ratio is smaller than the threshold. The threshold denotes a value for which it has been estimated in advance that there will be a high likelihood that the host vehicle M and the another vehicle m1 will come into contact with each other. The threshold may be a fixed value or a variable value set on the basis of the shape or the size of a road. Hereinafter, description will be given on the assumption that the predetermined value is 50 [%]. The tension controller 150 determines the operation timing of the pretensioner 90 on the basis of the TTC between the host vehicle M and the another vehicle m1.

For example, when the overlapping ratio is 50 [%] or larger, the tension controller 150 causes the pretensioner 90 to operate at a timing when the TTC between the host vehicle M and the another vehicle m1 derived by the approach degree deriver 130 becomes a first predetermined time. When the overlapping ratio is lower than 50 [%], the tension controller 150 causes the pretensioner 90 to operate when the TTC becomes a second predetermined time longer than the first predetermined time. For example, when the first predetermined time is approximately 300 [ms], the second predetermined time is set to approximately 400 [ms]. The first predetermined time and the second predetermined time may be fixed times different from each other or may be variable times set in accordance with a speed of the host vehicle M or the another vehicle m1, a road shape, or the like.

When the overlapping ratio is equal to or larger than the threshold, there is a high likelihood that the host vehicle M and the another vehicle m1 will come into contact with each other. Therefore, an occupant can be more reliably restrained in the seat and an influence on the occupant due to contact can be reduced by bringing the operation timing of the pretensioner 90 earlier compared to when the overlapping ratio is smaller than the threshold. Since an occupant can be notified by pulling the seatbelt 92 earlier, the occupant can be prepared for an impact due to contact between the host vehicle M and the another vehicle m1.

When the overlapping ratio is smaller than the threshold, there is a high likelihood that contact will be able to be avoided by driving operations of the host vehicle M and the another vehicle m1. Therefore, the operation timing of the pretensioner 90 is delayed compared to when the overlapping ratio is equal to or larger than the threshold, and thus an influence on a driving operation of an occupant due to the pulled seatbelt 92 can be curbed.

The tension controller 150 may perform control such that the operation timing of the pretensioner 90 is brought earlier linearly or non-linearly as the overlapping ratio increases. In this case, the tension controller 150 may set a largest value (an upper limit time) and a smallest value (a lower limit time) for the TTC adopted as a reference for operation of the pretensioner 90 such that the TTC is set so as not to exceed a range of the largest value to the smallest value. Accordingly, a situation in which the operation timing of the pretensioner 90 becomes excessively early or excessively late can be curbed, and thus the pretensioner 90 can be caused to operate at a more appropriate timing.

Figure 4:
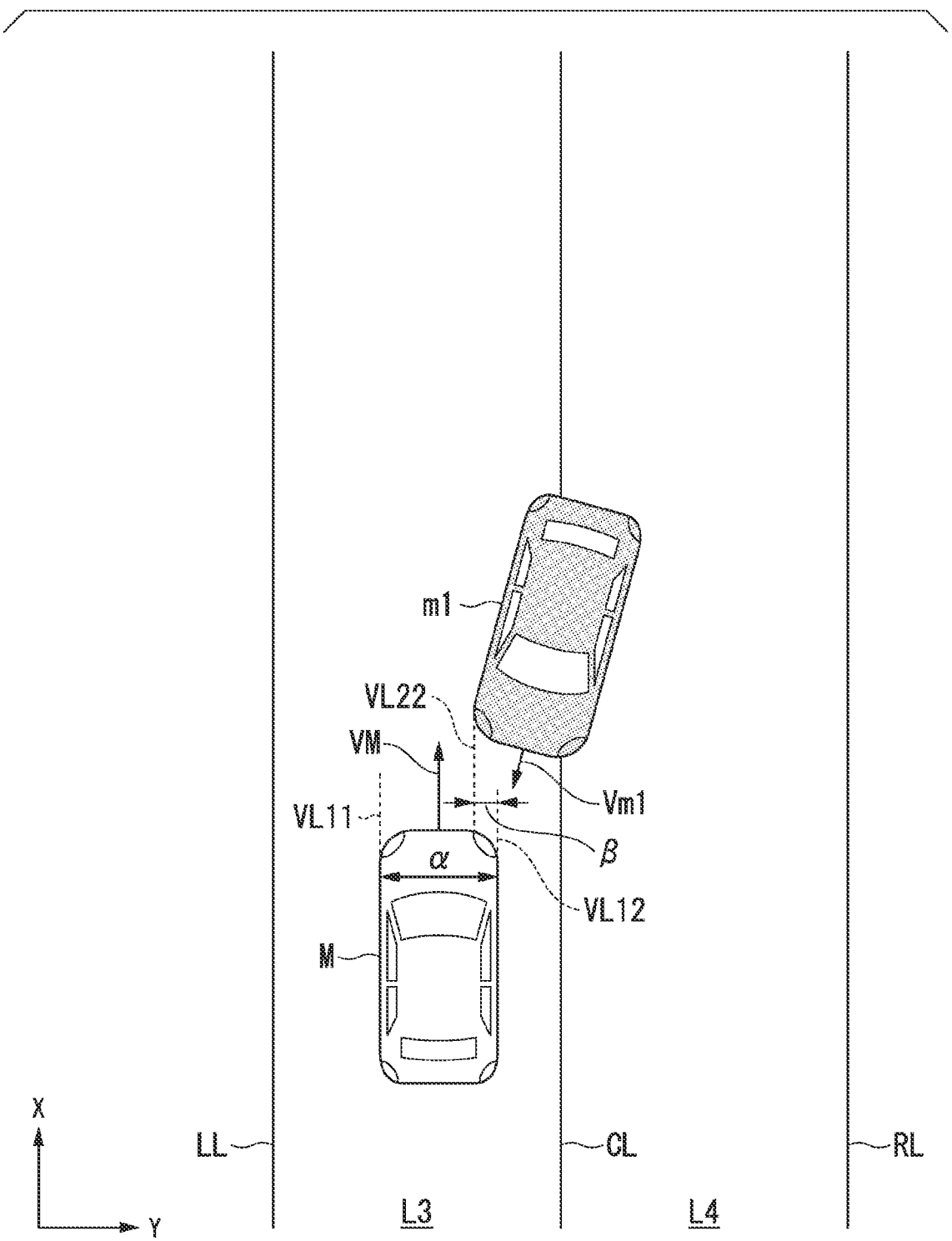
FIG. 4 is an explanatory view of a situation in which an operation timing of a pretensioner is adjusted in accordance with traveling situation of another vehicle.

The tension controller 150 may adjust the operation timing of the pretensioner 90 in accordance with a traveling state of the another vehicle m1. FIG. 4 is an explanatory view of a situation in which the operation timing of the pretensioner 90 is adjusted in accordance with traveling situation of the another vehicle m1. In the example of FIG. 4, a lane L3 (an example of a first lane) extending in an X axis direction and a lane L4 (an example of a second lane) that is an opposite lane of the lane L3 are illustrated. The lane L3 is demarcated by the road demarcation lines LL and CL, and the lane L4 is demarcated by the road demarcation lines CL and RL. Namely, the road demarcation line CL is a road demarcation line demarcating the lane L3 and the lane L4. It is assumed that the host vehicle M is traveling in the lane L3 at the speed VM and the another vehicle m1 has entered the lane L3 from the lane L4 on the outward side of the lane L3 while straddling the road demarcation line CL.

In this case, in addition to the degree of approach of the another vehicle m1, the approach degree deriver 130 judges whether or not the another vehicle m1 is approaching the host vehicle M while straddling the road demarcation line CL on the basis of recognition results of the recognizer 110. For example, when it is judged that at least a part of the another vehicle m1 has entered the lane L3, the approach degree deriver 130 judges that the another vehicle m1 is approaching the host vehicle M while straddling the road demarcation line CL. When the center or the center of gravity of the another vehicle m1 is present in the lane L3, the approach degree deriver 130 may judge that the another vehicle m1 is approaching the host vehicle M while straddling the road demarcation line CL. The approach degree deriver 130 may judge a degree of entry of the another vehicle m1 with respect to the lane L3. For example, the degree of entry denotes an index value indicating a proportion of the another vehicle m1 with respect to the another vehicle m1 in its entirety present in the lane L3.

Further, the approach degree deriver 130 derives the overlapping ratio (($\beta/\alpha$)×100) [%] on the basis of the vehicle width $\alpha$ of the host vehicle M and the overlap amount $\beta$ that is a distance between the virtual lines VL12 and VL22 in the lateral direction. In the example of FIG. 4, the virtual line VL22 is a line extending in the forward direction of the host vehicle M from the right end of the another vehicle m1, but it may be a virtual line extending in the forward direction of a main body of the another vehicle m1.

In place of (or in addition to) results of judging whether or not the overlapping ratio derived by the index value deriver 140 is equal to or larger than the threshold, the tension controller 150 controls the operation timing of the pretensioner 90 depending on whether or not the another vehicle m1 is approaching the host vehicle M while straddling the road demarcation line CL. In this case, the tension controller 150 brings the operation timing earlier when the another vehicle m1 is approaching the host vehicle M while straddling the road demarcation line CL compared to when it is not straddling the road demarcation line (in other words, the TTC for starting operation is lengthened).

For example, when the overlapping ratio derived by the index value deriver 140 is smaller than the threshold, the tension controller 150 may control the operation timing of the pretensioner 90 depending on whether or not the another vehicle m1 is approaching the host vehicle M while straddling the road demarcation line CL as described above. For example, when the another vehicle m1 is not approaching the host vehicle M while straddling the road demarcation line CL as described above, the tension controller 150 may control the operation timing of the pretensioner 90 on the basis of the overlapping ratio derived by the index value deriver 140. For example, the tension controller 150 may control the operation timing of the pretensioner 90 on the basis of the overlapping ratio and the degree of entry. In this case, the tension controller 150 brings the operation timing of the pretensioner 90 earlier as the overlapping ratio and the degree of entry increase.

As described above, when the another vehicle m1 is approaching the host vehicle M while straddling the road demarcation line CL, there is a high likelihood that it may not be intended by an occupant of the another vehicle m1 and some sort of event (for example, an abnormality of the another vehicle m1 or an abnormality of a driver) may have occurred, and there is a high likelihood that the host vehicle M and the another vehicle m1 will come into contact with each other. For this reason, when the another vehicle m1 is approaching the host vehicle M straddling the road demarcation line CL, an influence on an occupant when the host vehicle M and the another vehicle m1 have come into contact with each other can be curbed by bringing the operation timing of the pretensioner 90 earlier.

Figure 5:
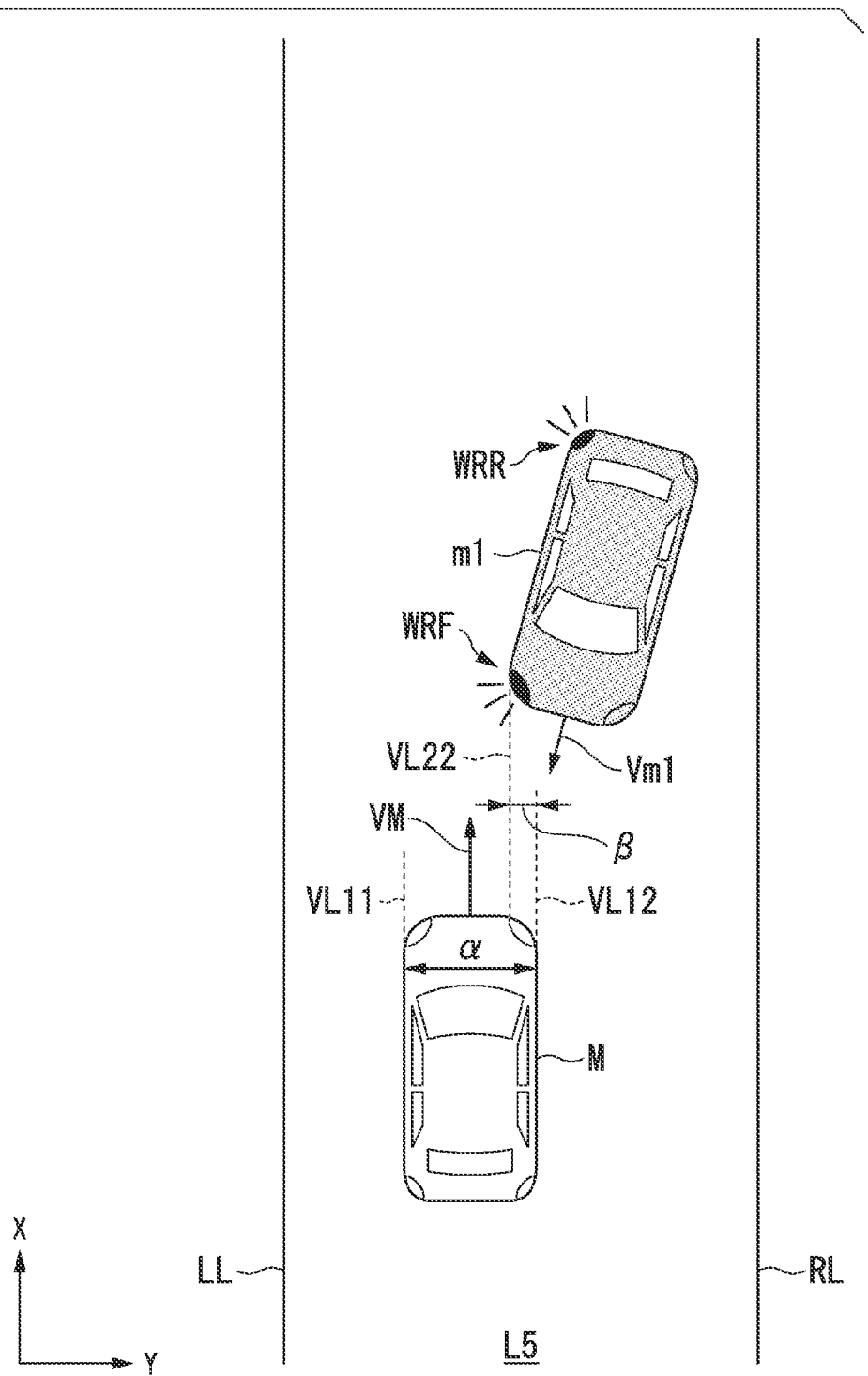
FIG. 5 is an explanatory view of a situation in which the operation timing of the pretensioner is controlled on the basis of an operation state of a blinker of the another vehicle.

The tension controller 150 may control the operation timing of the pretensioner 90 depending on whether or not a blinker (an example of a direction indicator) of the another vehicle m1 approaching the host vehicle M is operating. FIG. 5 is an explanatory view of a situation in which the operation timing of the pretensioner 90 is controlled on the basis of an operation state of the blinker of the another vehicle m1.

In the example of FIG. 5, an example in which the host vehicle M is traveling at the speed VM in a lane L5 demarcated by the road demarcation lines LL and RL and the another vehicle m1 is traveling at the speed Vm1 toward the host vehicle M from the opposite side of the lane L5 is illustrated. In the another vehicle m1, it is assumed that blinkers WRF and WRR in the front and the rear on the right side, of the blinkers provided in the front and the rear on the left and right sides, are flashing.

In this case, the recognizer 110 recognizes that the blinkers WRF and WRR of the another vehicle m1 are flashing from analysis results of an image captured by the vehicle exterior camera 10. When flashing of the blinker WRR cannot be recognized due a blind spot or the like of the vehicle exterior camera 10, the recognizer 110 recognizes only the flashing of the blinker WRF. When the tension controller 150 recognizes that the blinker of the another vehicle m1 is flashing on the basis of recognition results of the recognizer 110, it is judged that the direction indicator of the another vehicle m1 is operating. When it is judged that the direction indicator of the another vehicle m1 is operating, it is judged that an occupant of the another vehicle m1 intends to make a right turn or a left turn (a right turn in the case of FIG. 5) and is approaching the host vehicle M, and thus the operation timing of the pretensioner 90 is delayed (in other words, the TTC for starting operation is shortened) compared to when the another vehicle m1 is approaching the host vehicle M in a state in which the blinker is not operating.

For example, when the overlapping ratio derived by the index value deriver 140 is equal to or larger than the threshold, the tension controller 150 may control the operation timing of the pretensioner 90 in accordance with the operation state of the blinker of the another vehicle m1. For example, when the another vehicle m1 is approaching the host vehicle M while straddling the road demarcation line CL, the tension controller 150 may control the operation timing of the pretensioner 90 in accordance with the operation state of the blinker of the another vehicle m1.

When the tension controller 150 causes the pretensioner 90 to operate so as to pull the seatbelt 92 more intensively than that in the current situation and to more intensively restrain an occupant, the amount of tension may be a fixed value or may be adjusted on the basis of the index value (for example, the overlapping ratio) or the like derived by the index value deriver 140. In this case, the tension controller 150 controls the amount of tension such that it increases as the overlapping ratio increases. Since it is predicted that an impact at the time of contact will become larger as the overlapping ratio increases, movement of an occupant due to contact between the host vehicle M and the another vehicle m1 can be further curbed and the occupant can be in a more stable state by increasing the amount of tension in accordance with the level of the overlapping ratio. In place of (or in addition to) the control described above, the tension controller 150 may control the pretensioner 90 such that the tension of the seatbelt 92 is intensified as the load detected by the load sensor increases (as the weight of an occupant increases).

For example, depending on the kind of a curved road (for example, the radius of curvature or the size of curvature), an oncoming vehicle may be hidden in a blind spot or the like so that recognition may be delayed and the oncoming vehicle may suddenly approach the host vehicle M. In this case, there is a likelihood that deriving of the degree of approach (for example, the TTC) or the index value will be delayed or may not be able to be derived. For this reason, for example, when the radius of curvature of the traveling lane of the host vehicle M recognized by the recognizer 110 from the map information or an image captured by the vehicle exterior camera 10 is smaller than a first predetermined value (or when the curvature is equal to or larger than a second predetermined value), the tension controller 150 may bring the operation timing of the pretensioner 90 earlier from the operation timing adopted as a reference. For example, the operation timing adopted as a reference may be an operation timing when the host vehicle M is traveling in a lane of which the radius of curvature is equal to or larger than the first predetermined value (or a lane of which the curvature is smaller than the second predetermined value) or may be other operation timings set in advance as a reference. When the host vehicle M is traveling in a lane of which the radius of curvature is smaller than the first predetermined value (or a lane of which the curvature is equal to or larger than the second predetermined value), the tension controller 150 may cause the pretensioner 90 to operate also in a state in which the degree of approach or the index value have not been able to be derived. According to the foregoing control, even when an oncoming vehicle suddenly approaches the host vehicle M from a blind spot or the like and comes into contact therewith, an occupant can be restrained and protected in the seat. When traveling in a sharp curve or the like, lateral movement of an occupant due to an influence of a centrifugal force or the like can be curbed and an occupant can drive more stably by the pretensioner 90 being caused to operate.

[Processing Flow]

Hereinafter, a series of processing performed by the control device 100 will be described using a flowchart. Hereinafter, in the processing executed by the control device 100, description will be given focusing on processing of controlling the operation timing of the pretensioner 90 (operation timing control processing) mainly on the basis of the index value and situation in the vicinity described above. Hereinafter, three kinds of operation timing control processing will be described.

[First Operation Timing Control Processing]

Figure 6:
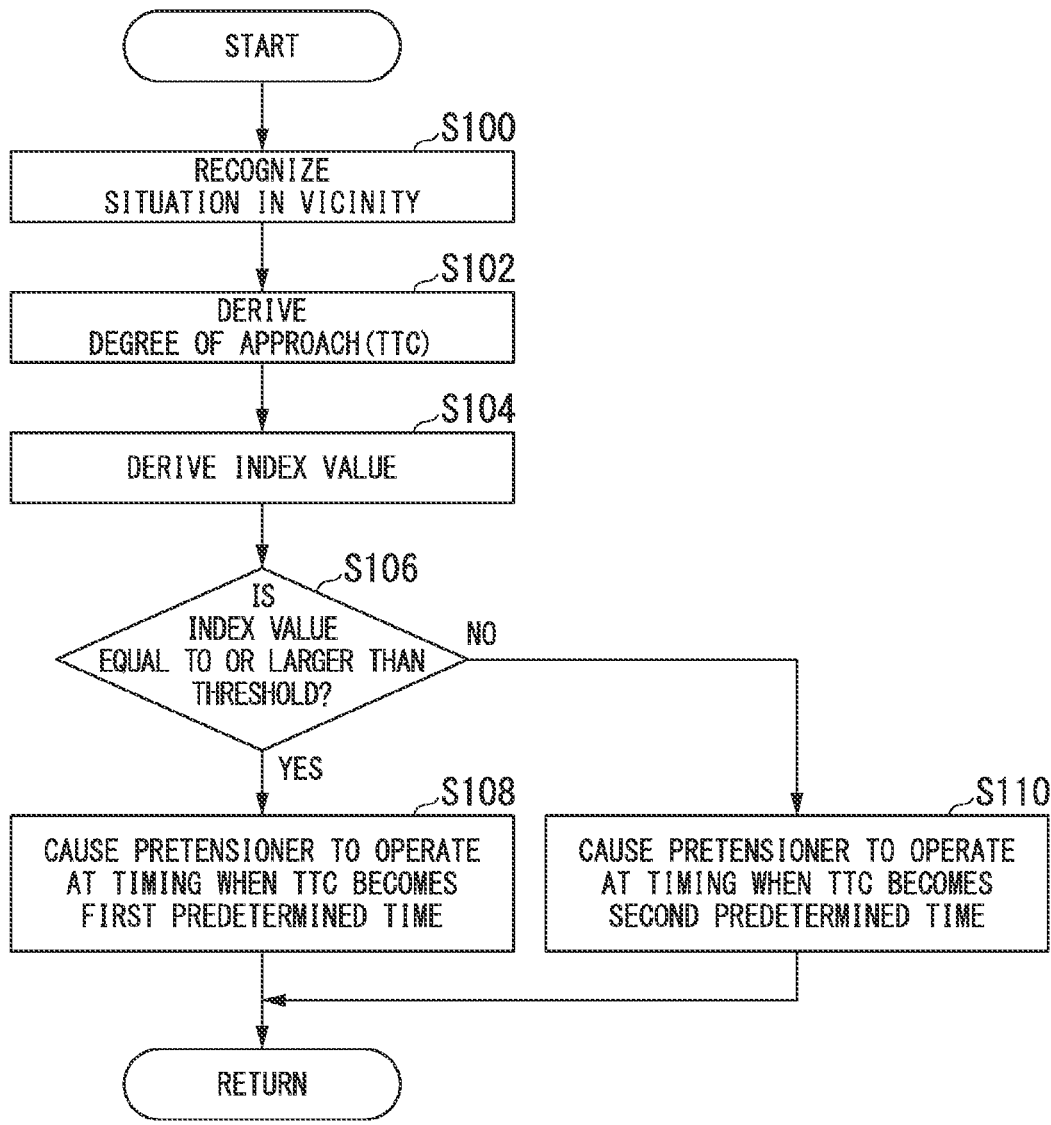
FIG. 6 is a flowchart showing a flow of first operation timing control processing.

FIG. 6 is a flowchart showing a flow of first operation timing control processing. The processing in this flowchart may be repeatedly executed in a predetermined cycle. The same applies to the second and third operation timing control processing.

First, the recognizer 110 recognizes situation in the vicinity of the host vehicle M (Step S100). Next, the approach degree deriver 130 derives the degree of approach (for example, the TTC) of the another vehicle m1 present in the vicinity of the host vehicle M with respect to the host vehicle M (Step S102). Next, the index value deriver 140 derives the index value (for example, the overlap amount) indicating the overlapping degree between the predicted traveling trajectory in which the host vehicle M will travel in the future and the predicted traveling trajectory in which the another vehicle m1 will travel in the future (Step S104).

Next, the tension controller 150 judges whether or not the index value is equal to or larger than the threshold (Step S106). When it is judged that the index value is equal to or larger than the threshold, the tension controller 150 causes the pretensioner 90 to operate at a timing when the TTC between the host vehicle M and the another vehicle m1 becomes the first predetermined time (Step S108). When it is judged that the index value is not equal to or larger than the threshold (is smaller than the threshold), the tension controller 150 causes the pretensioner 90 to operate at a timing when the TTC becomes the second predetermined time longer than the first predetermined time (Step S110). Accordingly, the processing in this flowchart ends. According to the first operation timing control processing described above, the TTC for operating the pretensioner 90 can be switched in accordance with at least the index value (the overlapping ratio).

[Second Operation Timing Control Processing]

Figure 7:
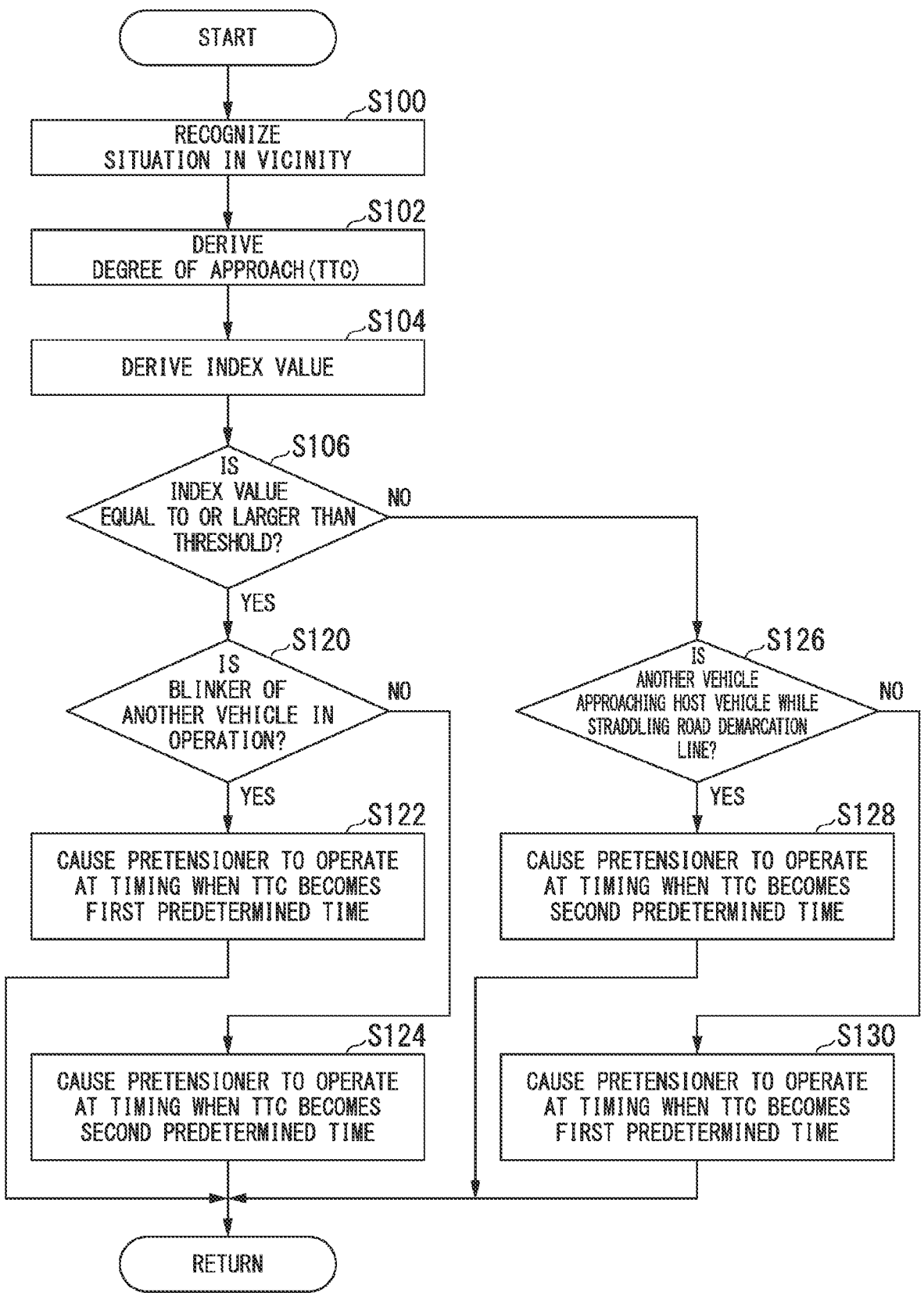
FIG. 7 is a flowchart showing a flow of second operation timing control processing.

FIG. 7 is a flowchart showing a flow of a second operation timing control processing. The second operation timing control processing differs in further having processing of Steps S120 to S130 in place of the processing of Steps S108 to S110 compared to Steps S100 to S110 in the first operation timing control processing. Therefore, hereinafter, description will be given mainly focusing on the processing of Steps S120 to S130.

In the processing of Step S106, when it is judged that the index value is equal to or larger than the threshold, the tension controller 150 judges whether or not the blinker of the another vehicle m1 is in operation (Step S120). When it is judged that the blinker of the another vehicle m1 is in operation, the tension controller 150 causes the pretensioner 90 to operate at a timing when the TTC becomes the first predetermined time (Step S122). When it is judged that the blinker of the another vehicle m1 is not in operation, the tension controller 150 causes the pretensioner 90 to operate at a timing when the TTC becomes the second predetermined time longer than the first predetermined time (Step S124).

In the processing of Step S106, when it is judged that the index value is not equal to or larger than the threshold (is smaller than the threshold), the tension controller 150 judges whether or not the another vehicle m1 is approaching the host vehicle M while straddling the road demarcation line from the outward side of the traveling lane of the host vehicle M (Step S126). When it is judged that the another vehicle m1 is approaching the host vehicle M while straddling the road demarcation line, the tension controller 150 causes the pretensioner 90 to operate at a timing when the TTC becomes the second predetermined time (Step S128). When it is judged that the another vehicle m1 is not approaching the host vehicle M while straddling the road demarcation line, the tension controller 150 causes the pretensioner 90 to operate at a timing when the TTC becomes the first predetermined time (Step S130). Accordingly, the processing in this flowchart ends. According to the second operation timing control processing described above, effects similar to those of the first operation timing control processing are exhibited. Furthermore, the pretensioner 90 can be caused to operate at a more appropriate timing in accordance with situation in the vicinity (for example, a state of the another vehicle m1).

[Third Operation Timing Control Processing]

Figure 8:
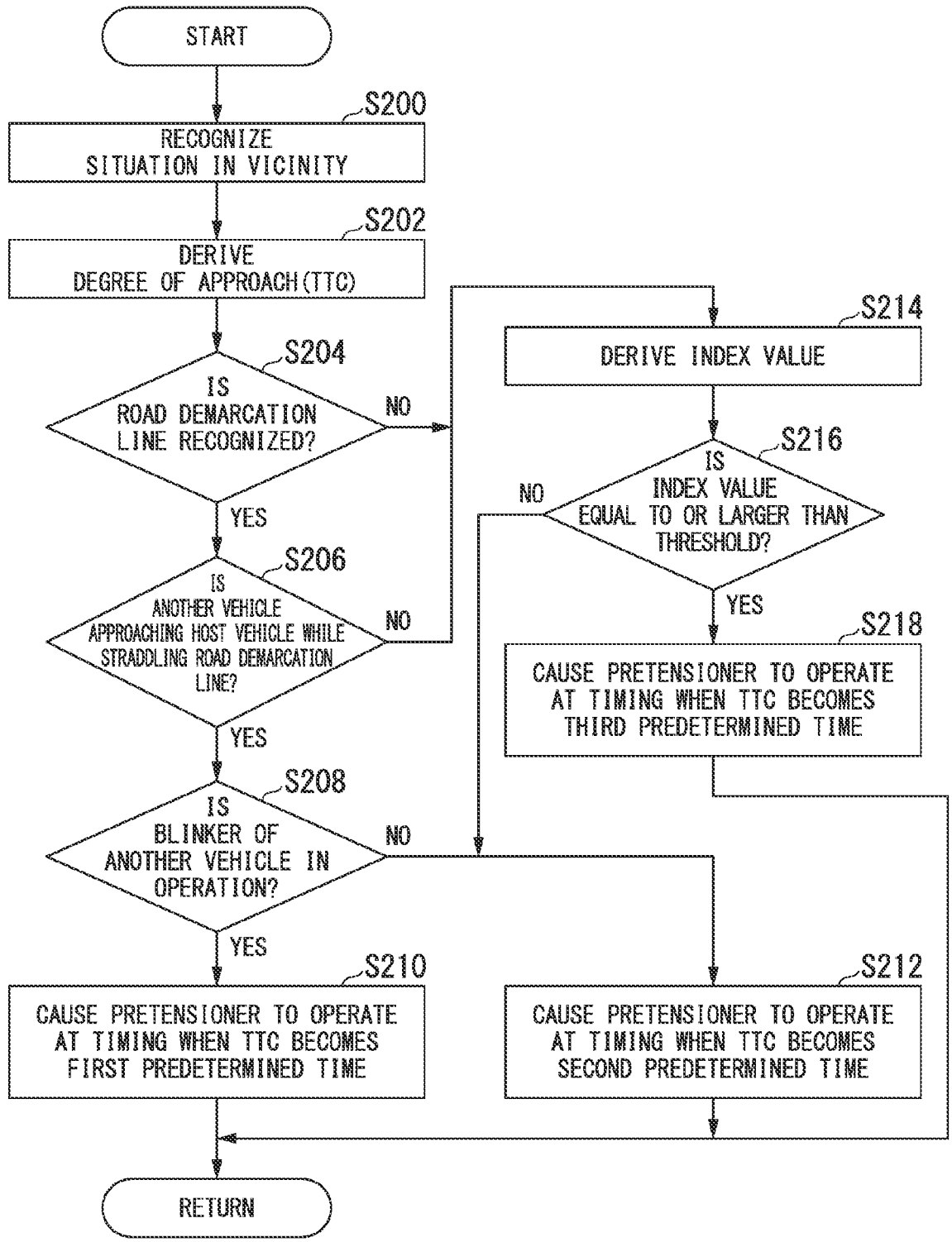
FIG. 8 is a flowchart showing a flow of third operation timing control processing.

FIG. 8 is a flowchart showing a flow of a third operation timing control processing. In the third operation timing control processing as well, similar to the second operation timing control processing, the operation timing of the pretensioner 90 is controlled on the basis of the overlapping ratio and situation in the vicinity (for example, a state of the another vehicle m1, or the like). First, the recognizer 110 recognizes situation in the vicinity of the host vehicle M (Step S200). Next, the approach degree deriver 130 derives the degree of approach (for example, the TTC) of the another vehicle m1 present in the vicinity of the host vehicle M with respect to the host vehicle M (Step S202).

Next, the recognizer 110 judges whether or not the road demarcation line between the first lane in which the host vehicle M is traveling and the second lane in which the another vehicle m1 is traveling is recognized (Step S204). When it is judged that the road demarcation line is recognized, the tension controller 150 judges whether or not the another vehicle m1 is approaching the host vehicle M while straddling the road demarcation line (Step S206). When it is judged that the another vehicle m1 is approaching the host vehicle M while straddling the road demarcation line, the tension controller 150 judges whether or not the blinker of the another vehicle m1 is in operation (Step S208). When it is judged that the blinker of the another vehicle m1 is in operation, the tension controller 150 causes the pretensioner 90 to operate at a timing when the TTC becomes the first predetermined time (Step S210). When it is judged that the blinker of the another vehicle m1 is not in operation, the tension controller 150 causes the pretensioner 90 to operate at a timing when the TTC becomes the second predetermined time longer than the first predetermined time (Step S212).

In the processing of Step S204, when it is judged that the road demarcation line demarcating the first lane and the second lane is not recognized, the index value deriver 140 derives the index value indicating the overlapping degree between the predicted traveling trajectory in which the host vehicle M will travel in the future and the predicted traveling trajectory in which the another vehicle m1 will travel in the future (Step S214). Next, the tension controller 150 judges whether or not the index value is equal to or larger than the threshold (Step S216). When it is judged that the index value is not equal to or larger than the threshold (is smaller than the threshold), the tension controller 150 causes the pretensioner 90 to operate at a timing when the TTC becomes the second predetermined time (Step S116). When it is judged that the index value is equal to or larger than the threshold, the tension controller 150 causes the pretensioner 90 to operate at a timing when the TTC becomes a third predetermined time longer than the second predetermined time (Step S218). For example, when the first predetermined time is approximately 300 [ms], the second predetermined time is set to approximately 400 [ms] and the third predetermined time is set to approximately 500 [ms]. The first to third predetermined times may be fixed times different from each other or may be variable times set in accordance with a speed of the host vehicle M or the another vehicle m1, a road shape, or the like. Accordingly, the processing in this flowchart ends. According to the third operation timing control processing described above, effects similar to those of the second operation timing control processing are exhibited.

In addition to the operation timing control processing described above, the first predetermined time, the second predetermined time, and the third predetermined time may be adjusted in accordance with a shape of the road on which the host vehicle M is traveling or the relative speeds of the host vehicle M and the another vehicle m1. In the embodiment described above, the another vehicle m1 may not be an oncoming vehicle and may be a different object having a likelihood that it will come into contact with the host vehicle M in place of a another vehicle.

According to the embodiment described above, the vehicle seatbelt device 1 includes the seatbelt 92 that restrains a part of the body of an occupant in the host vehicle M, the pretensioner 90 (an example of a tension adjustment mechanism) that is able to adjust a tension of the seatbelt 92, the recognizer 110 that recognizes situation in the vicinity of the host vehicle M, the index value deriver 140 that derives an index value indicating an overlapping degree between a predicted traveling trajectory of a another vehicle which is recognized by the recognizer 110 and approaches the host vehicle M and a predicted traveling trajectory of the host vehicle, and the tension controller 150 that controls an operation timing of the pretensioner 90 on the basis of the index value derived by the index value deriver 140 and a degree of approach of the another vehicle with respect to the host vehicle M, and thus operation of the seatbelt can be more appropriately controlled in accordance with situation in the vicinity.

Moreover, according to the embodiment described above, when there is a likelihood that the host vehicle M will come into contact with a another vehicle, the amount of tension of the seatbelt can be increased at a more appropriate timing on the basis of the overlapping ratio between the host vehicle M and the another vehicle, the TTC, whether or not the another vehicle deviates from the traveling lane, and the operation state of the blinker of the another vehicle. Therefore, according to the embodiment, an occupant can be more appropriately protected on the basis of situation in the vicinity. As a result, a driver of the host vehicle M and safety around the host vehicle M can be further improved.

Moreover, according to the embodiment described above, since the pretensioner 90 can be caused to operate at an appropriate timing, an influence on manual driving of an occupant can be curbed through operation of the pretensioner 90 at a timing when the occupant performs an operation of avoiding approaching with respect to a another vehicle by manual driving. According to the embodiment described above, unnecessary operation of the pretensioner 90 can be reduced, and thus a time for returning to an occupant protection posture can be secured.

The embodiment described above can be expressed as follows.

A vehicle seatbelt device includes a storage device storing a program and a hardware processor and is configured, when the hardware processor executes the program stored in the storage device, to recognize situation in the vicinity of a host vehicle, to derive an index value indicating an overlapping degree between a predicted traveling trajectory of recognized another vehicle approaching the host vehicle and a predicted traveling trajectory of the host vehicle, and to control an operation timing of a tension adjustment mechanism which is able to adjust a tension of a seatbelt restraining a part of the body of an occupant in the host vehicle on the basis of the derived index value and a degree of approach of the another vehicle with respect to the host vehicle.

Hereinabove, forms for performing the present invention have been described using the embodiment, but the present invention is not limited to the embodiment in any way. Various modifications and replacements can be added within a range not departing from the gist of the present invention.

What is claimed is:

1. A vehicle seatbelt device comprising:
   a seatbelt that restrains a part of a body of an occupant in a host vehicle;
   a tension adjustment mechanism that is able to adjust a tension of the seatbelt;
   a recognizer that recognizes a situation in a vicinity of the host vehicle;
   an index value deriver that derives an index value indicating an overlapping degree between a predicted traveling trajectory of another vehicle which is recognized by the recognizer and approaches the host vehicle and a predicted traveling trajectory of the host vehicle; and
   a tension controller that controls an operation timing of the tension adjustment mechanism on a basis of the index value derived by the index value deriver and a degree of approach of the another vehicle with respect to the host vehicle,
   wherein when the index value is equal to or greater than a threshold value, the tension controller determines whether or not a direction indicator of the another vehicle approaching the host vehicle is operating, and
   wherein when the tension controller determines that the direction indicator is operating, the tension controller delays the operation timing of the tension adjustment mechanism compared to when the direction indicator is not operating.

2. The vehicle seatbelt device according to claim 1, wherein when the index value is equal to or larger than a threshold, the tension controller brings the operation timing of the tension adjustment mechanism earlier compared to when the index value is smaller than the threshold.

3. The vehicle seatbelt device according to claim 1, wherein the recognizer recognizes a road demarcation line demarcating a road on which the host vehicle is traveling, and
   wherein when the another vehicle is approaching the host vehicle while straddling the road demarcation line, the tension controller brings the operation timing of the tension adjustment mechanism earlier compared to when the another vehicle is not straddling the road demarcation line.

4. The vehicle seatbelt device according to claim 1, wherein the tension controller intensifies the tension of the seatbelt on a basis of the operation timing.

5. The vehicle seatbelt device according to claim 1, wherein the degree of approach includes information related to a time when the host vehicle and the another vehicle are predicted to come into contact with each other.

6. The vehicle seatbelt device according to claim 1, wherein when a radius of curvature of a traveling lane of the host vehicle is smaller than a first predetermined value or when curvature of the traveling lane is equal to or larger than a second predetermined value, the tension controller brings the operation timing of the tension adjustment mechanism earlier compared to when the radius of curvature of the traveling lane of the host vehicle is equal to or larger than the first predetermined value or when the curvature of the traveling lane is smaller than the second predetermined value.

7. A tension control method in which
   a computer of a vehicle seatbelt device
   recognizes a situation in a vicinity of a host vehicle,
   derives an index value indicating an overlapping degree between a predicted traveling trajectory of a recognized another vehicle approaching the host vehicle and a predicted traveling trajectory of the host vehicle,
   controls an operation timing of a tension adjustment mechanism which is able to adjust a tension of a seatbelt restraining a part of a body of an occupant in the host vehicle on a basis of the derived index value and a degree of approach of the another vehicle with respect to the host vehicle,
   when the index value is equal to or greater than a threshold value, determines whether or not a direction indicator of the another vehicle approaching the host vehicle is operating, and
   when it is determined that the direction indicator is operating, delays the operation timing of the tension adjustment mechanism compared to when the direction indicator is not operating.

8. A computer readable non-temporary storage medium storing a program for causing
   a computer of a vehicle seatbelt device
   to recognize a situation in a vicinity of a host vehicle,
   to derive an index value indicating an overlapping degree between a predicted traveling trajectory of a recognized another vehicle approaching the host vehicle and a predicted traveling trajectory of the host vehicle,
   to control an operation timing of a tension adjustment mechanism which is able to adjust a tension of a seatbelt restraining a part of a body of an occupant in the host vehicle on a basis of the derived index value and a degree of approach of the another vehicle with respect to the host vehicle,
   when the index value is equal to or greater than a threshold value, to determine whether or not a direction indicator of the another vehicle approaching the host vehicle is operating, and
   when it is determined that the direction indicator is operating, to delay the operation timing of the tension adjustment mechanism compared to when the direction indicator is not operating.

* * * * *